(12) United States Patent
Hashimoto et al.

(10) Patent No.: US 10,137,767 B2
(45) Date of Patent: Nov. 27, 2018

(54) POWER TRANSMISSION UNIT FOR VEHICLE

(71) Applicant: Toyota Jidosha Kabushiki Kaisha, Toyota-shi (JP)

(72) Inventors: Hiroto Hashimoto, Susono (JP); Tomohito Ono, Susono (JP); Hiroaki Kimura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 234 days.

(21) Appl. No.: 15/231,874

(22) Filed: Aug. 9, 2016

(65) Prior Publication Data
US 2017/0043656 A1 Feb. 16, 2017

(30) Foreign Application Priority Data

Aug. 10, 2015 (JP) .................. 2015/158505

(51) Int. Cl.
| | |
|---|---|
| F16H 3/72 | (2006.01) |
| B60K 6/365 | (2007.10) |
| B60K 6/387 | (2007.10) |
| B60K 6/40 | (2007.10) |
| B60K 6/405 | (2007.10) |
| B60K 6/445 | (2007.10) |

(Continued)

(52) U.S. Cl.
CPC .............. *B60K 6/365* (2013.01); *B60K 6/387* (2013.01); *B60K 6/40* (2013.01); *B60K 6/405* (2013.01); *B60K 6/445* (2013.01); *F16H 3/727* (2013.01); *F16H 45/02* (2013.01); *B60K 2006/381* (2013.01); *B60Y 2300/71* (2013.01); *B60Y 2400/42* (2013.01); *B60Y 2400/73* (2013.01); *B60Y 2400/78* (2013.01); *Y02T 10/6239* (2013.01)

(58) Field of Classification Search
None
See application file for complete search history.

(56) References Cited

U.S. PATENT DOCUMENTS

| | | |
|---|---|---|
| 2012/0018272 A1 | 1/2012 | Yamada et al. |
| 2013/0109523 A1 | 5/2013 | Shibata et al. |
| 2014/0113760 A1 | 4/2014 | Diemer et al. |

(Continued)

FOREIGN PATENT DOCUMENTS

| | | |
|---|---|---|
| JP | 2009-120043 A | 6/2009 |
| JP | 2012/219957 A | 11/2012 |

(Continued)

*Primary Examiner* — Justin Holmes
(74) *Attorney, Agent, or Firm* — Oblon, McClelland, Maier & Neustadt, L.L.P.

(57) ABSTRACT

A power transmission unit that can prevent an entrance of excessive torque to the powertrain is provided. The power transmission unit includes a transmission that transmits torque between an engine and drive wheels; a locking device that selectively halts a rotation of an output shaft of the engine; a transmission case holding a first motor, a second motor, the transmission, and the locking device; a first torque limiter disposed between the engine and the locking device to restrict torque transmitted between the drive wheels and the engine; and a second torque limiter held in the transmission case to restrict torque transmitted between the drive wheels and the locking device.

7 Claims, 13 Drawing Sheets

(51) Int. Cl.
*F16H 45/02* (2006.01)
*B60K 6/38* (2007.10)

(56) References Cited

U.S. PATENT DOCUMENTS

| | | | |
|---|---|---|---|
| 2014/0335998 A1* | 11/2014 | Ichikawa | F16H 57/0006 477/5 |
| 2014/0349799 A1* | 11/2014 | Kaltenbach | B60K 6/365 475/5 |
| 2015/0005125 A1* | 1/2015 | Hayashi | B60K 6/365 475/2 |
| 2015/0040720 A1 | 2/2015 | Kitabatake et al. | |
| 2015/0105200 A1 | 4/2015 | Duhaime et al. | |
| 2015/0375737 A1* | 12/2015 | Iwase | B60K 6/445 477/5 |
| 2016/0107518 A1* | 4/2016 | Okuwaki | B60K 6/387 701/22 |
| 2016/0250917 A1 | 9/2016 | Shibata et al. | |

FOREIGN PATENT DOCUMENTS

| | | |
|---|---|---|
| JP | 2015-77846 A | 4/2015 |
| WO | 2013/140527 A1 | 9/2013 |

\* cited by examiner

POWER TRANSMISSION UNIT FOR VEHICLE

CROSS REFERENCE TO RELATED APPLICATIONS

The present disclosure claims the benefit of priority to Japanese Patent Application No. 2015-158505 filed on Aug. 10, 2015 with the Japanese Patent Office, the entire contents of which are incorporated herein by reference in its entirety.

BACKGROUND

Field of the Disclosure

Embodiments of the present disclosure relates to the art of a power transmission unit for delivering torque of a prime mover to drive wheels, and especially to a power transmission unit having a torque limiter for preventing the prime mover and the power transmission unit from being subjected to an overload.

Discussion of the Related Art

JP-A-2009-120043 describes a drive unit for a hybrid vehicle having an engine, a first motor and a second motor, and a single-pinion planetary gear unit for distributing torque of the first motor to the engine and to the drive wheels. According to the teachings of JP-A-2009-120043, in the planetary gear unit, a carrier is connected to the engine, a sun gear is connected to the first motor, and a ring gear is connected to an output member for delivering power to the drive wheels. In the drive unit taught by JP-A-2009-120043, an operating mode can be selected from an electric mode in which the vehicle is powered at least by one of the first motor and the second motor while stopping the engine, a regeneration mode in which at least one of the first motor and the second motor is operated as a generator, and an engine mode in which the vehicle is powered by the engine. In order to halt a rotation of the engine during propulsion under the electric mode, the drive unit taught by JP-A-2009-120043 is provided with a dog clutch serving as a locking device in a casing holding the motors and the planetary gear unit.

US2015/0040720 A1 describes a vehicular transmission including a transmission input shaft to which engine torque is input, and a torque limiter arranged between the transmission input shaft and an engine. According to the teachings of US2015/0040720 A1, the torque limiter is configured to enable torque transmission between the transmission input shaft and an engine output shaft, and to inhibit an input of excessive torque larger than predetermined torque between the transmission input shaft and the engine output shaft. The vehicular transmission taught by US2015/0040720 is also used in a hybrid vehicle having an engine and two motors, and further provided with a one-way clutch serving as a locking device to prohibit reverse rotation of the engine while allowing normal rotation of the engine. The one-way clutch is fixed to a flywheel connected to an output shaft of the engine between the engine and a transmission, and the torque limiter and a damper device are also fixed to the flywheel outside of a transmission casing.

According to the teachings of JP-A-2009-120043, a drag loss of the engine can be reduced by halting (i.e., locking) a rotation of the engine by the locking device during propulsion under the electric mode. In addition, during propelling the vehicle by both motors, an output torque of the first motor can be delivered efficiently to the output member through the planetary gear unit by halting a rotation of the carrier together with the engine. In the drive unit taught by JP-A-2009-120043, a powertrain between the engine and the drive wheels can be prevented from being subjected to an excessive torque by arranging the torque limiter taught by US2015/0040720 in the powertrain. However, if the locking device is actuated during propulsion under the electric mode, the torque limiter may not function in the powertrain. In this situation, if an excessive disturbance torque is applied from the drive wheel, gears and shafts of the powertrain between the drive wheels and the locking device may be subjected to an excessive load.

SUMMARY

Aspects of preferred embodiments of the present application have been conceived noting the foregoing technical problems, and it is therefore an object of the present application is to provide a power transmission unit that can prevent an entrance of excessive torque to the powertrain during halting a rotation of the engine or the motor by the locking device.

The present disclosure relates to a power transmission unit for a vehicle, comprising: a prime mover including a main prime mover, a first motor and a second motor; a transmission that transmits torque between the main prime mover and drive wheels and between the first motor and the drive wheels; a locking device that selectively halts a rotation of an output shaft of the main prime mover by bringing a rotary member into engagement to a stationary member; a transmission case holding the first motor, the second motor, the transmission, and the locking device; and a first torque limiter that is disposed between the main prime mover and the locking device to restrict torque transmitted between the drive wheels and the main prime mover. In order to achieve the above-explained objective, according to the preferred embodiment of the present application, the power transmission unit is provided with a second torque limiter that is held in the transmission case to restrict torque transmitted between the drive wheels and the locking device.

In a non-limiting embodiment, the locking device may include an engagement device that serves as the second torque limiter.

In a non-limiting embodiment, the transmission case may include a casing in which a rear end opposite to the main prime mover is opened, and a rear cover closing the rear end, and the locking device may be attached to the rear cover.

In a non-limiting embodiment, the transmission may include a single-pinion planetary gear unit comprising a sun gear connected to the first motor, a ring gear connected to the drive wheels through the second motor and an output gear train, and a carrier connected to the output shaft and the rotary member. In addition, the locking device may be adapted to halt rotations of the output shaft and the carrier.

In a non-limiting embodiment, the transmission may include an input shaft connected to the output shaft, the first motor may include a hollow rotor shaft that is rotated integrally with a rotor of the first motor, the power transmission unit may further provided with an intermediate shaft that is inserted into a hollow space of the rotor shaft while being supported by a bearing in such a manner as to rotate relatively with the rotor shaft, the output shaft may be connected to the rotary member through the input shaft and the intermediate shaft, and the locking device may be disposed on an opposite side of the main prime mover across the first motor.

In a non-limiting embodiment, the power transmission may be further provided with an oil pump that is driven by the main prime mover to generate hydraulic pressure, and the oil pump may be connected to the output shaft through the intermediate shaft and the input shaft.

In a non-limiting embodiment, the locking device may be overlapped with the oil pump in a diametrical direction of the output shaft, the input shaft, or the intermediate shaft.

Thus, according to the preferred embodiment of the present application, the locking device that selectively halts a rotation of the output shaft of the main prime mover is disposed between the prime mover and the drive wheels. In addition, the first torque limiter is disposed between the main prime mover and the locking device, and the second torque limiter is disposed between the drive wheels and the locking device to restrict a transmission torque. In the power transmission unit, if the locking device is in engagement, torque entering into the power transmission unit from the drive wheel is stopped by the locking device, and hence the first torque limiter is not allowed to limit the torque entering into the power transmission unit from the drive wheel. In the power transmission unit, however, the second torque limiter is disposed between the drive wheels and the locking device. According to the preferred embodiment, therefore, an excessive torque entering from the drive wheels can be released outside of the power transmission unit even if the locking device is in engagement. That is, the power transmission unit can be prevented from being damaged by the excessive torque entering from the drive wheels. For this reason, strengths of gears and shafts of the power transmission unit can be reduced. In addition, since the locking device and the second torque limiter are held in the transmission case, an intrusion of water, mud, dust, etc. into the locking device and the second torque limiter can be prevented.

Specifically, the locking device is brought into disengagement by an input torque torque greater than a predetermined magnitude to be restricted by the second torque limiter. For example, a frictional multiple-plate clutch in which a frictional engagement force is adjustable, and a dog clutch (or a tooth clutch) adapted to establish a component of torque acting on a contact site between engagement faces in a direction of rotational axis may be used as the locking device. That is, the locking device may serve not only as a locking device but also as a torque limiter. According to the preferred embodiment, therefore, the power transmission unit may be downsized, and a manufacturing cost of the power transmission unit can be reduced.

As described, the locking device is fixed to the rear cover of the transmission case, and held in the transmission case by attaching the rear cover to the rear end of the casing. According to the preferred embodiment, therefore, the locking device may be integrated with the rear cover as a unit so that assembling steps as well as man-hour can be reduced. In addition, such casing may also be used in the power transmission unit without using the locking device to reduce assembling steps and manufacturing cost.

Since the rotary member of the locking device is connected to the carrier of the planetary gear unit together with the output shaft of the main prime mover, the carrier is allowed to serve as a reaction element to deliver output torque of the first motor to the output gear train by halting a rotation of the carrier by the locking device. According to the preferred embodiment, therefore, energy efficiency can be improved during propelling the vehicle by the first motor and the second motor.

As also described, the output shaft of the main prime mover is connected to the rotary member of the locking device through the intermediate shaft inserted into the hollow space of the rotor shaft of the first motor and the input shaft of the transmission, and the intermediate shaft is supported by the bearing in such a manner as to rotate relatively with the rotor shaft. According to the preferred embodiment, therefore, the power transmission unit can be downsized in the direction of the rotational axis in comparison with the power transmission unit in which the bearing is disposed on an inner wall or a partition wall of the casing.

As also described, the intermediate shaft is further connected to the oil pump. That is, the intermediate shaft also serves as a rotary shaft of the oil pump, and the oil pump is connected to the output shaft of the main prime mover through the intermediate shaft. According to the preferred embodiment, therefore, the rotary shaft of the oil pump may be omitted to reduce number of parts and manufacturing cost.

As also described, the oil pump is disposed in the inner circumferential side of the locking device, and the locking device is overlapped with the oil pump in the diametrical direction of the rotary shaft of the power transmission unit. That is, the oil pump and the locking device are situated at substantially the same position in the direction of the rotational axis. According to the preferred embodiment, therefore, the power transmission unit can be further downsized in the direction of the rotational axis.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
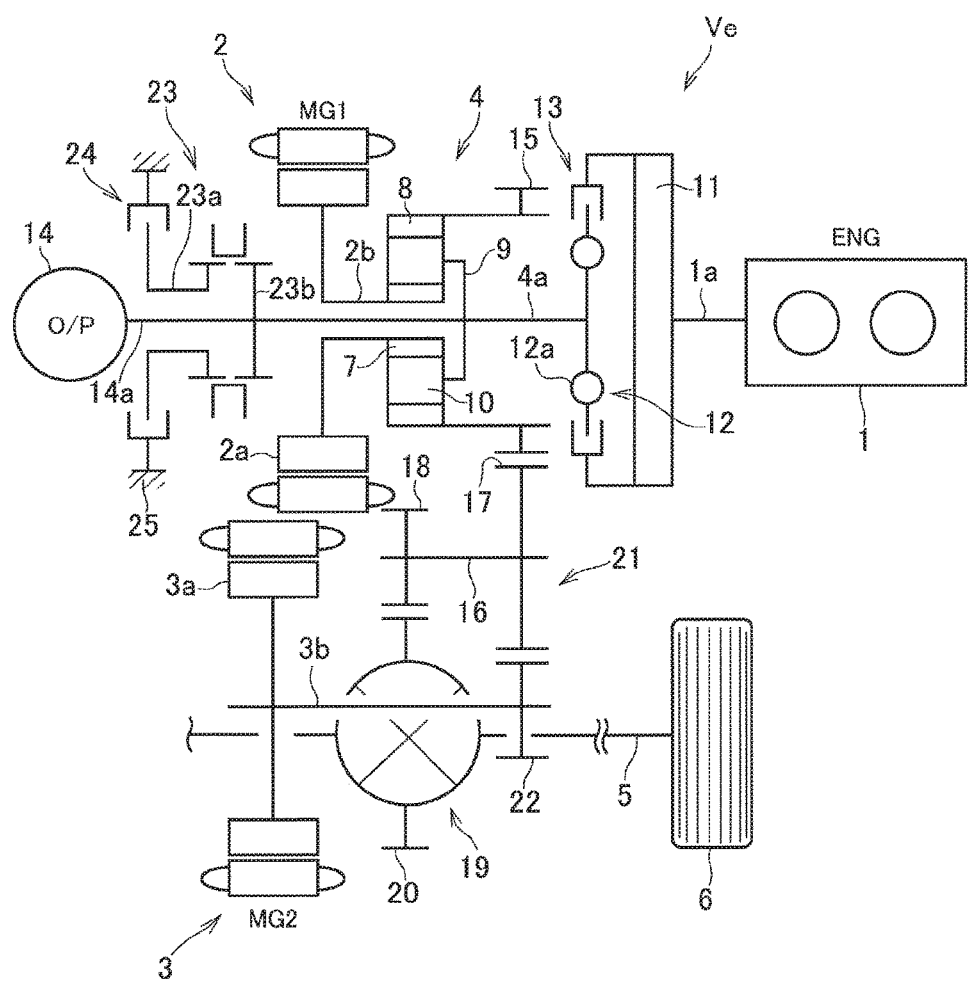
FIG. 1 is a schematic illustration showing a first example of the power transmission unit of the vehicle according to the present application.

Preferred embodiments of the present application will now be explained with reference to the accompanying drawings. Referring now to FIG. 1, there is shown a first example of a vehicle Ve to which the power transmission unit according to the present application is applied. A prime mover of the vehicle Ve shown in FIG. 1 includes an engine (referred to as "ENG" in FIG. 1) 1 as a main prime mover, a first motor (referred to as "MG1" in FIG. 1) 2, and a second motor (referred to as "MG2" in FIG. 1) 3. An output power of the engine 1 is distributed to the first motor 2 and to a driveshaft 5 through a power distribution device 5, and the second motor 3 can be driven as a motor by an electric power generated by the first motor 2 to rotate the driveshaft 5 and drive wheels 6.

The power distribution device 4 is a single-pinion planetary gear unit comprising a sun gear 7, a ring gear 8 and a carrier 9, and arranged coaxially between the engine 1 and the first motor 2 to deliver torque to the drive wheels 6. In the power distribution device 4, the ring gear 8 as an internal gear is situated around the sun gear 7, and a plurality of pinion gears 10 interposed between the sun gear 7 and the ring gear 8 are supported by the carrier 9 while being allowed to rotate and revolve around the sun gear 7.

In the power distribution device 4, specifically, the carrier 9 is connected to an input shaft 4a that is also connected to an output shaft 1a of the engine 1 through a flywheel 11 having a damper device 12 and a first torque limiter 13. In other words, the output shaft 1a of the engine 1 is connected to the carrier 9 of the power distribution device 4 through the flywheel 11, the damper device 12 and the first torque limiter 13.

Thus, the flywheel 11 is interposed between the output shaft 1a of the engine 1 and the input shaft 4a of the power distribution device 4, and the damper device 12 is attached to the flywheel 11 on the other side of the output shaft 1a of the engine 1 (i.e., to the left side in FIG. 1). The damper device 12 is adapted to absorb torsional vibrations on the output shaft 1a resulting from torque pulse of the engine 1 elastically by a damper spring(s) 12a, and for example, a conventional damper device described in US2015/0040720 may be used as the damper device 12.

Figure 2:
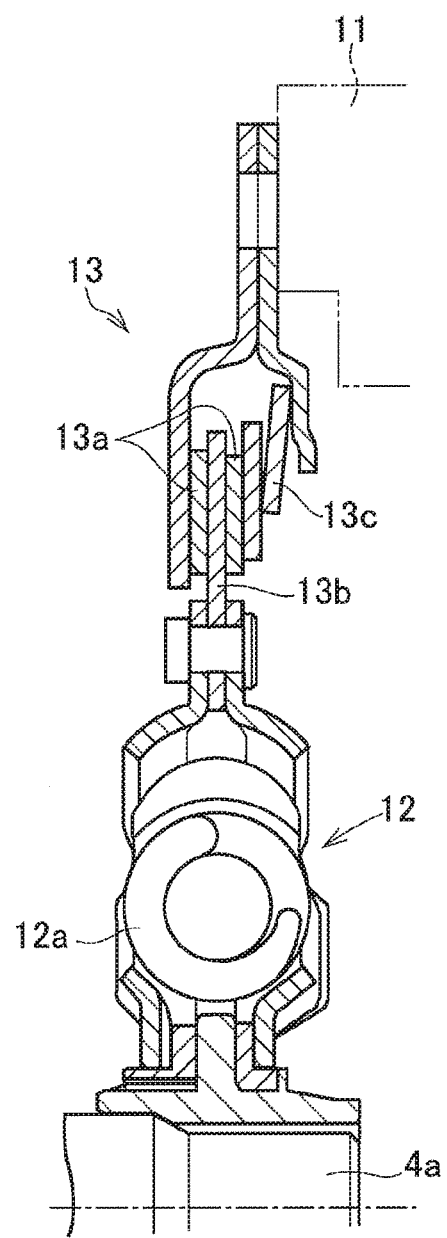
FIG. 2 is a cross-sectional view of the first torque limiter.

In order to restrict a magnitude of the torque transmitted between the engine 1 and the drive wheels 6, the first torque limiter 13 is arranged around the damper device 12. A structure of the first torque limiter 13 is shown in FIG. 2 in more detail. As illustrated in FIG. 2, friction plates 13a individually connected to the output shaft 1a through the flywheel 11 and a friction plate 13b connected to the input shaft 4a through the damper device 12 are elastically pushed by a diaphragm spring 13c to be brought into engagement. Consequently, a rotary member of the output shaft 1a side is integrated with a rotary member of the input shaft 4a side through the first torque limiter 13. In the first torque limiter 13, a friction force acting between the friction plate 13a and the friction plate 13b is governed by an elastic force of the diaphragm spring 13c. That is, an upper limit value of the torque transmittable through the first torque limiter 13 can be adjusted by adjusting a constant of the diaphragm spring 13c.

The first motor 2 is disposed on the opposite side of the engine 1 across the power distribution device 4 (i.e., on the left side in FIG. 1), and the sun gear 7 of the power distribution device 4 is connected to a hollow rotor shaft 2b rotated together with a rotor 2a of the first motor 2. A rotary shaft 14a of an oil pump 14 penetrates through the rotor shaft 2b and the sun gear 7 to be connected to the input shaft 4a.

A first drive gear 15 as an external gear is integrally formed around the ring gear 8 of the power distribution device 4, and a countershaft 16 is arranged in parallel with a common rotational axis of the power distribution device 4 and the first motor 2. A counter driven gear 17 is fitted onto one of end portions of the countershaft 16 (i.e., right side in FIG. 1) in such a manner as to be rotated therewith while being meshed with the first drive gear 15. A counter drive gear (i.e., a final drive gear) 18 is fitted onto the other end portion of the countershaft 16 (i.e., left side in FIG. 1) in such a manner as to be rotated therewith while being meshed with a differential ring gear (i.e., a final driven gear) 20 of a deferential gear unit 19 as a final reduction. Thus, the ring gear 8 of the power distribution device 4 is connected to the driveshaft 5 and the drive wheels 6 through the first drive gear 15, the countershaft 16, the counter driven gear 17, the counter drive gear 18, and an output gear train 21 having the differential ring gear 20.

In the power transmission unit of the vehicle Ve, an output torque of the second motor 3 can be added to the torque delivered from the power distribution device 4 to the driveshaft 5. To this end, a rotor 3a of the second motor 4 is connected to a rotor shaft 3b extending in parallel with the countershaft 16 to rotate integrally therewith, and a second drive gear 22 is fitted onto a leading end of the rotor shaft 3b to be rotated integrally therewith while being meshed with the counter driven gear 17. Thus, the ring gear 8 of the power distribution device 4 and the second motor 3 are individually connected to the driveshaft 5 through the output gear train 21 and the second drive gear 22.

The power transmission unit of the vehicle Ve is further provided with a locking device 23 that halts a rotation of the output shaft 1a of the engine 1, and a second torque limiter 24 that prevents the power transmission unit from being subjected to an excessive load.

In the power transmission unit shown in FIG. 1, the first motor 2, the second motor 3, the power distribution device 4, the locking device 23 etc. are held in a transmission case 25, and the locking device 23 is disposed between the transmission case 25 and the input shaft 4a or the carrier 9. The locking device 23 is an engagement device adapted to selectively provide a connection between the input shaft 4a and a stationary member 23a. To this end, in the locking device 23, the stationary member 23a is connected to the transmission case 25 through a second torque limiter 24, and a rotary member 23b is fitted onto the input shaft 4a to be rotated integrally therewith. In the power transmission unit, rotations of the input shaft 4a, the output shaft 1a and the carrier 9 are halted by bringing the rotary member 23b into engagement to the stationary member 23a through a friction clutch or a dog clutch.

As described, the vehicle Ve is allowed to be propelled efficiently by the first motor 2 and the second motor 3 by bringing the locking device 23 into engagement to halt rotations of the input shaft 4a, the output shaft 1a and the carrier 9. In this situation, however, torque entering into the power transmission unit from the drive wheel 6 is stopped by the stationary member 23a of the locking device 23, and prevented from being delivered to the first torque limiter 13 disposed closer to the engine 1 than the locking device 23. That is, when the locking device 23 is in engagement, the first torque limiter 13 is not allowed to limit the torque entering into the power transmission unit from the drive wheel 6. In order to protect the power transmission unit from an excessive torque applied from the drive wheels 6 even if the locking device 23 is in engagement, the second torque limiter 24 is arranged in the power transmission unit.

The second torque limiter 24 is adapted to restrict the torque transmitted between the drive wheels 6 and the locking device 23 while the rotary member 23a is brought into engagement to the stationary member 23b. To this end, the second torque limiter 24 also has a structure illustrated in FIG. 2. That is, as the first torque limiter 13, an upper limit value of the torque transmittable through the second torque limiter 24 may also be adjusted by adjusting a constant of the diaphragm spring. In the power transmission unit shown in FIG. 1, the second torque limiter 24 is disposed between the stationary member 23a and the transmission case 25. Specifically, the second torque limiter 24 is held in the transmission case 25, and the stationary member 23a of the locking device 23 is fixed to the transmission case 25 through the second torque limiter 24.

Figure 3:
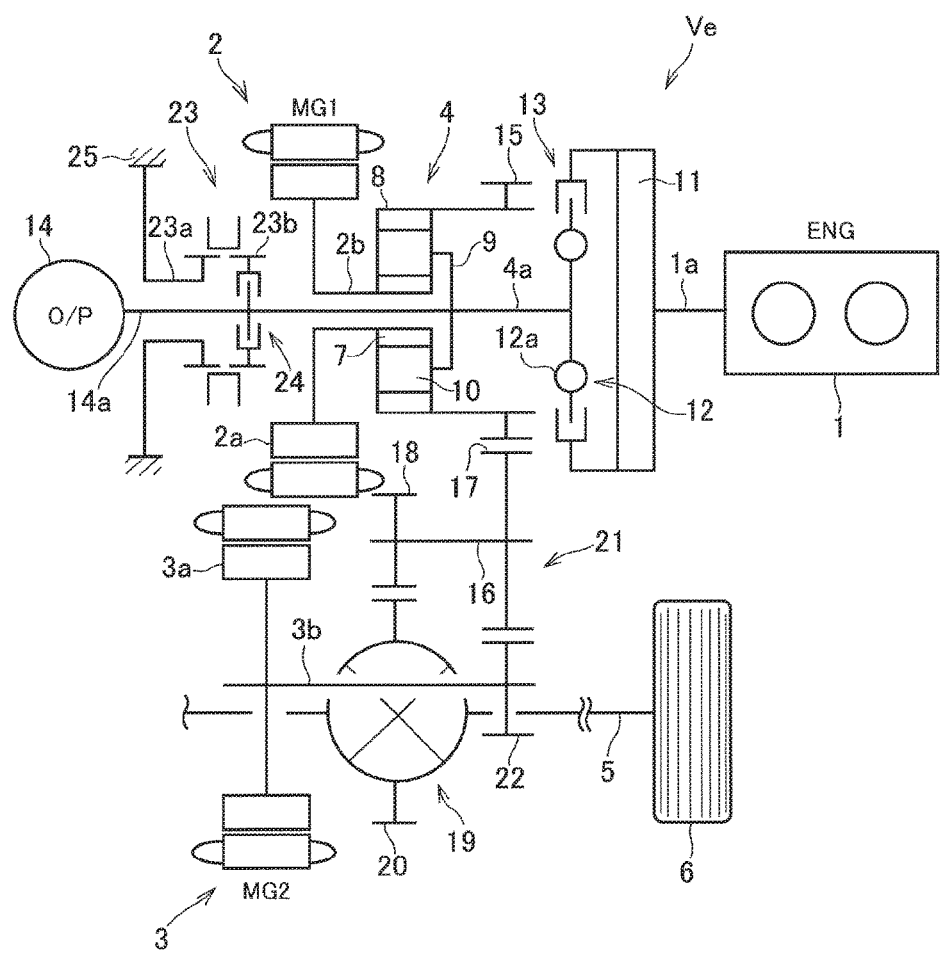
FIG. 3 is a schematic illustration showing a second example of the power transmission unit of the vehicle according to the present application.

As shown in FIG. 3, according to the second example of the power transmission unit, the second torque limiter 24 may also be disposed between the rotary member 23b of the locking device 23 and the input shaft 4a or the carrier 9. According to the second example, in the locking device 23, the stationary member 23a is fixed directly to the transmission case 25, and the rotary member 23b is connected to the input shaft 4a and the carrier 9 through the second torque limiter 24 that is fitted onto the input shaft 4a to be rotated integrally with the input shaft 4a and the rotary member 23b.

Thus, in the examples shown in FIGS. 1 and 3, the locking device 23 and the second torque limiter 24 are disposed on the common rotational axis of the output shaft 1a, the input shaft 4a and the rotor shaft 2b, in the opposite side of the engine 1 across the power distribution device 4. In the power transmission unit of the vehicle Ve, positions of the locking device 23 and the second torque limiter 24 may be altered s shown in FIGS. 4 to 8.

Figure 4:
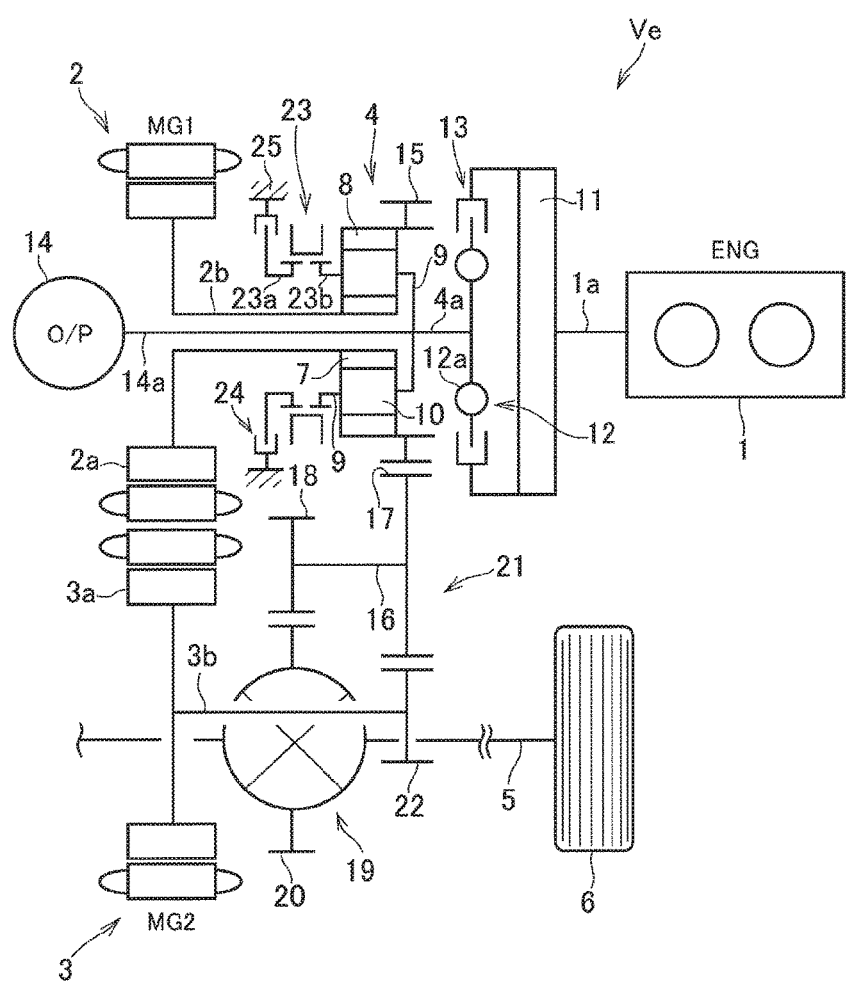
FIG. 4 is a schematic illustration showing a third example of the power transmission unit of the vehicle according to the present application.

According to the third example shown in FIG. 4, the locking device 23 and the second torque limiter 24 are disposed on the common rotational axis of the output shaft 1a, the input shaft 4a and the rotor shaft 2b between the first motor 2 and the power distribution device 4. Specifically, in the locking device 23, the rotary member 23b is connected to the carrier 9 to be rotated integrally therewith in an opposite side of the engine 1, and the stationary member 23a is fixed to the transmission case 25 through the second torque limiter 24.

Figure 5:
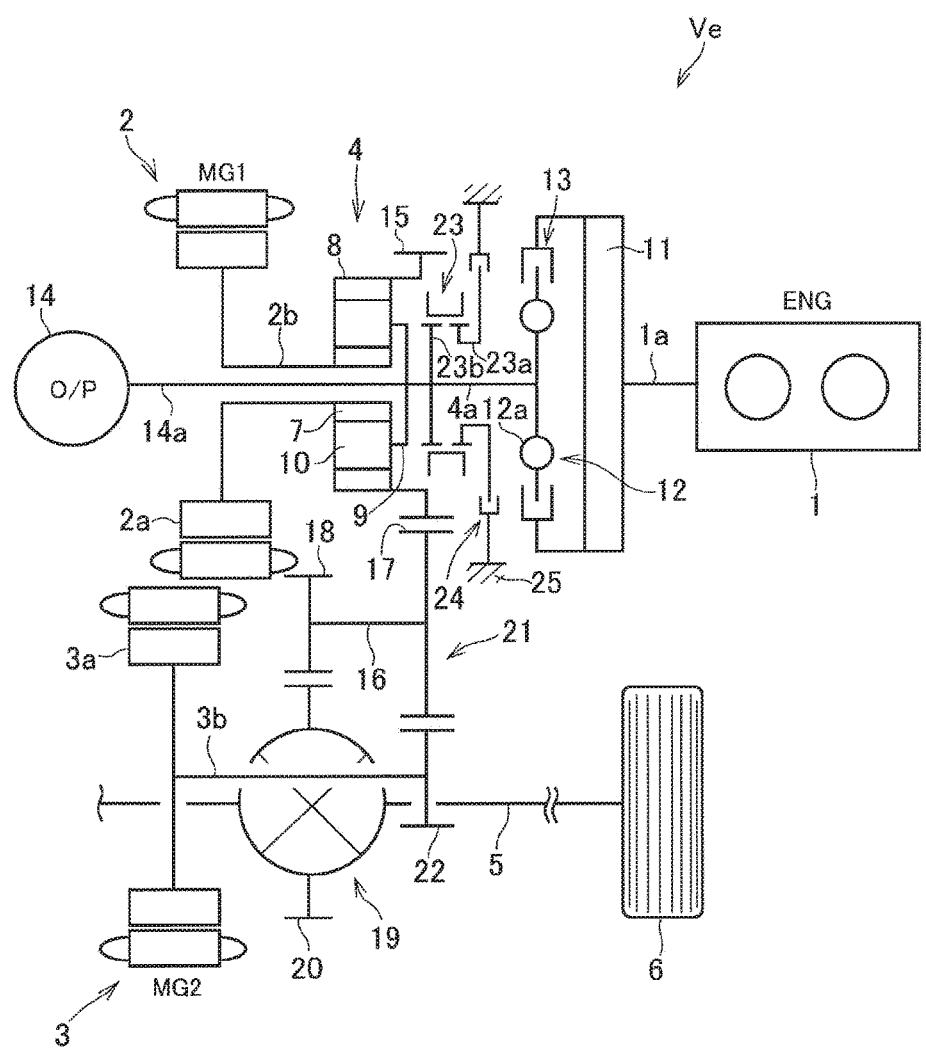
FIG. 5 is a schematic illustration showing a fourth example of the power transmission unit of the vehicle according to the present application.

According to the fourth example shown in FIG. 5, the locking device 23 and the second torque limiter 24 are disposed on the common rotational axis of the output shaft 1a, the input shaft 4a and the rotor shaft 2b between the power distribution device 4 and the damper device 12. Specifically, in the locking device 23, the rotary member 23b is connected to the input shaft 4a to be rotated integrally therewith in the engine 1 side, and the stationary member 23a is fixed to the transmission case 25 through the second torque limiter 24.

Figure 6:
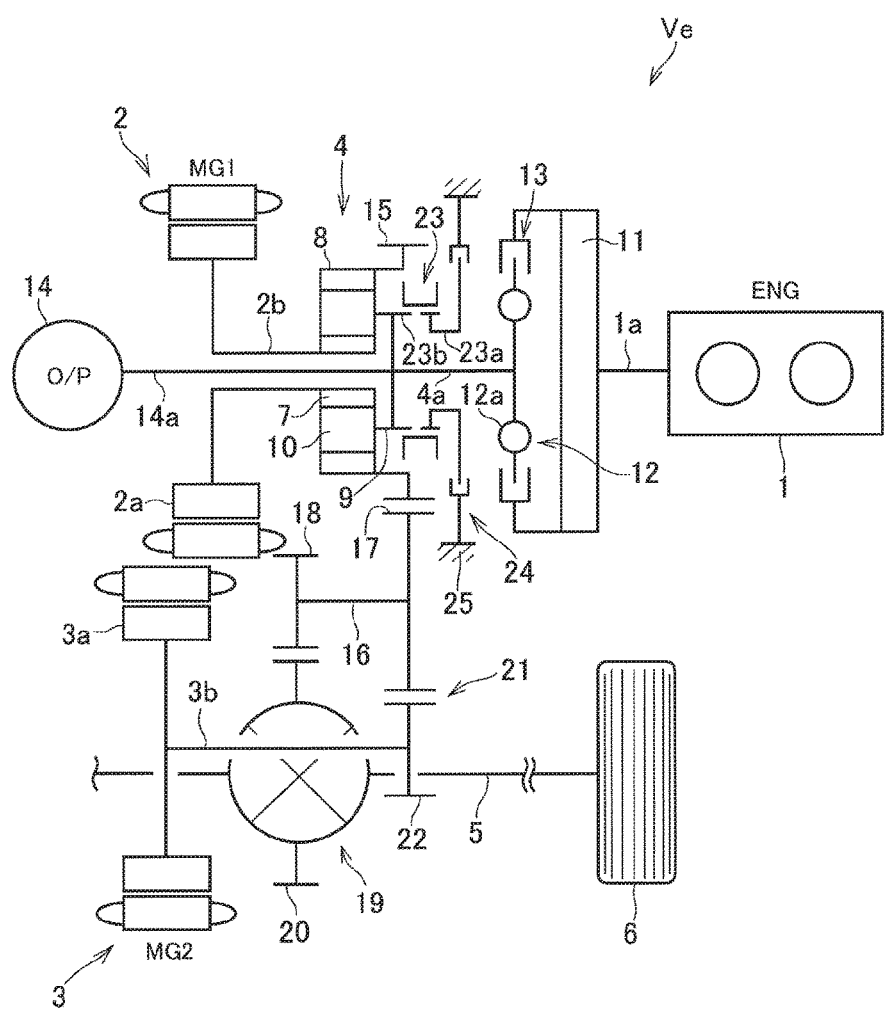
FIG. 6 is a schematic illustration showing a fifth example of the power transmission unit of the vehicle according to the present application.

According to the fifth example shown in FIG. 6, the locking device 23 and the second torque limiter 24 are also disposed on the common rotational axis of the output shaft 1a, the input shaft 4a and the rotor shaft 2b between the power distribution device 4 and the damper device 12. In this case, in the locking device 23, the rotary member 23b is connected to the carrier 9 to be rotated integrally therewith in the engine 1 side, and the stationary member 23a is also fixed to the transmission case 25 through the second torque limiter 24.

As described, the second torque limiter 24 is adapted to restrict the torque transmitted between the drive wheels 6 and the locking device 23 while the rotary member 23a is brought into engagement to the stationary member 23b. To this end, the position of the second torque limiter 24 may also be altered as long as the torque transmitted between the drive wheels 6 and the locking device 23 can be limited under the above-explained condition. For example, as shown in FIGS. 7 and 8, the second torque limiter 24 may be arranged separately from the locking device 23.

Figure 7:
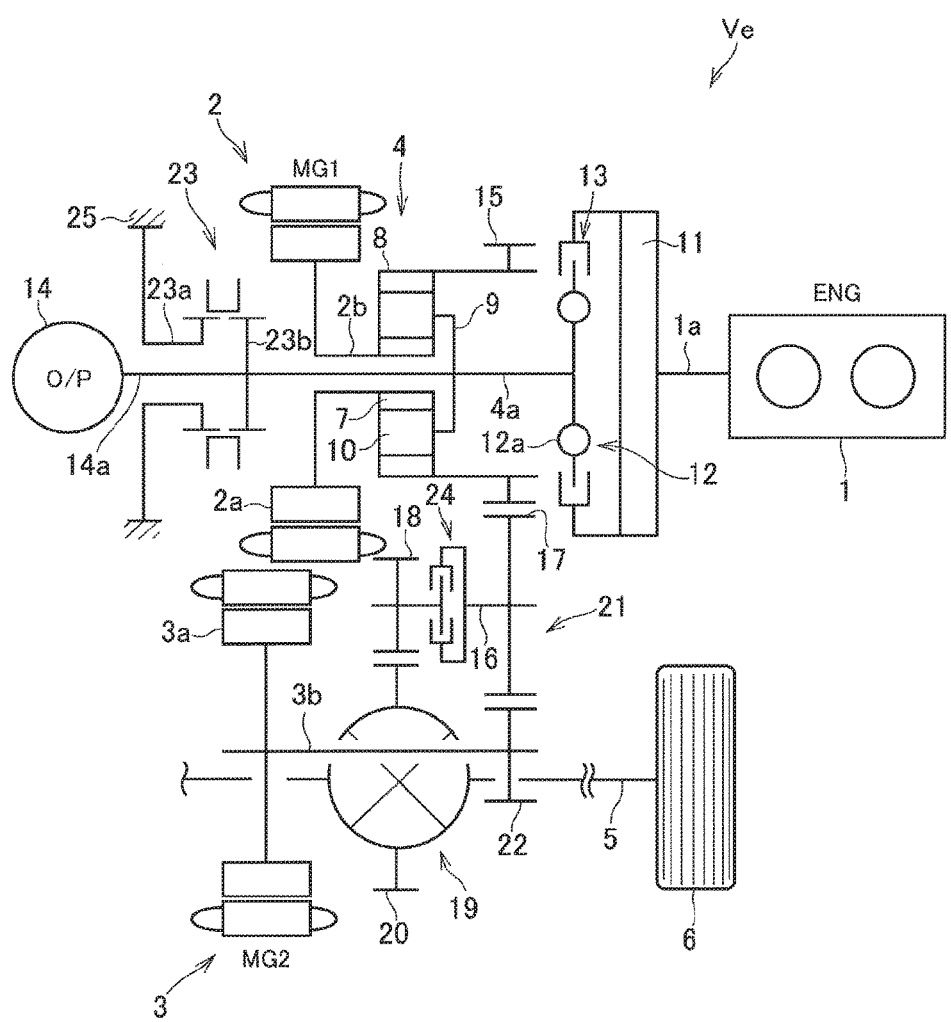
FIG. 7 is a schematic illustration showing a sixth example of the power transmission unit of the vehicle according to the present application.

According to the sixth example shown in FIG. 7, the locking device 23 is disposed on the common rotational axis of the output shaft 1a, the input shaft 4a and the rotor shaft 2b in the opposite side of the engine 1 across the power distribution device 4. Specifically, in the locking device 23, the rotary member 23b is connected to the input shaft 4a to be rotated integrally therewith in the opposite side of the engine 1, and the stationary member 23a is fixed directly to the transmission case 25. According to the sixth example, the second torque limiter 24 is disposed on the counter shaft 16 between the counter driven gear 17 and the counter drive gear 18.

Figure 8:
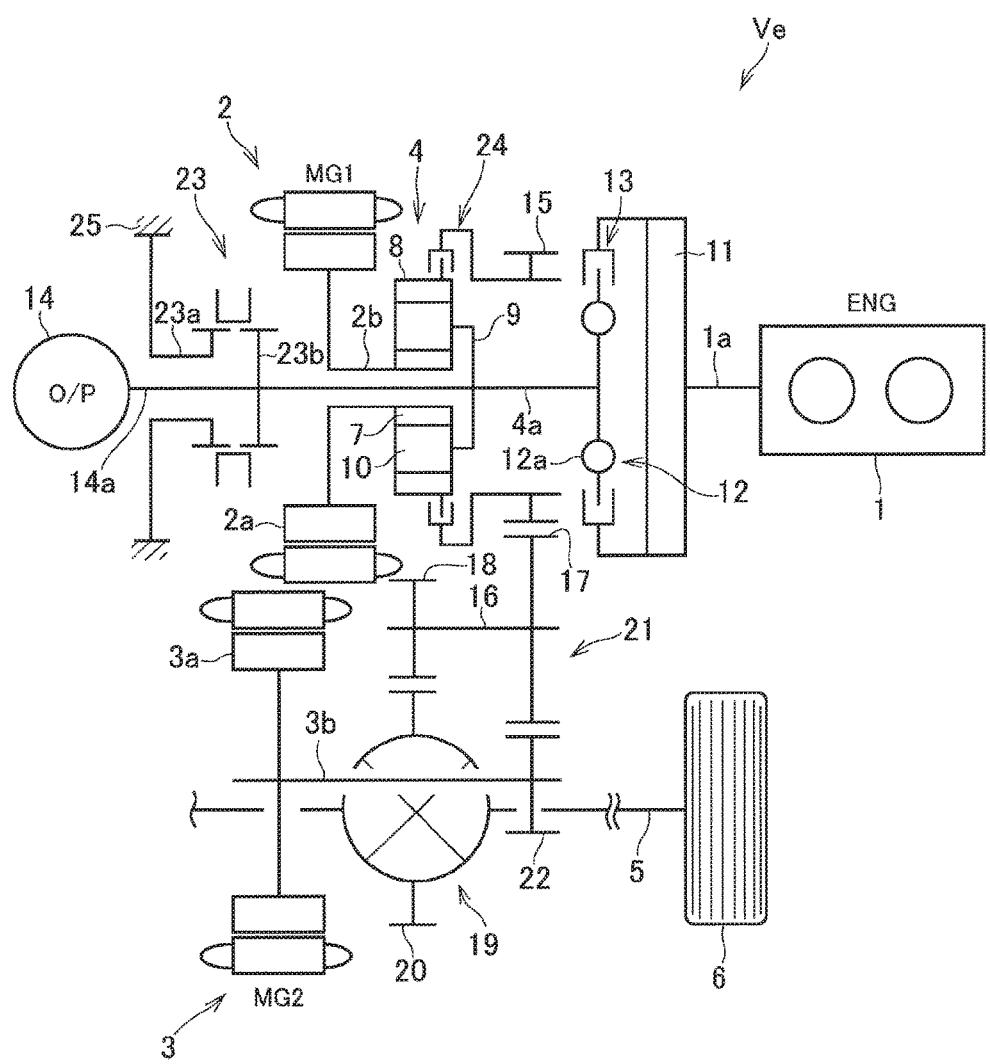
FIG. 8 is a schematic illustration showing a seventh example of the power transmission unit of the vehicle according to the present application.

According to the seventh example shown in FIG. 8, the locking device 23 is also disposed on the common rotational axis of the output shaft 1a, the input shaft 4a and the rotor shaft 2b in the opposite side of the engine 1 across the power distribution device 4. In this case, in the locking device 23, the rotary member 23b is also connected to the input shaft 4a to be rotated integrally therewith in the opposite side of the engine 1, and the stationary member 23a is also fixed directly to the transmission case 25. According to the seventh example, the second torque limiter 24 is disposed on the common rotational axis of the output shaft 1a, the input shaft 4a and the rotor shaft 2b between the ring gear 8 of the power distribution device 4 and the first drive gear 15.

Figure 9:
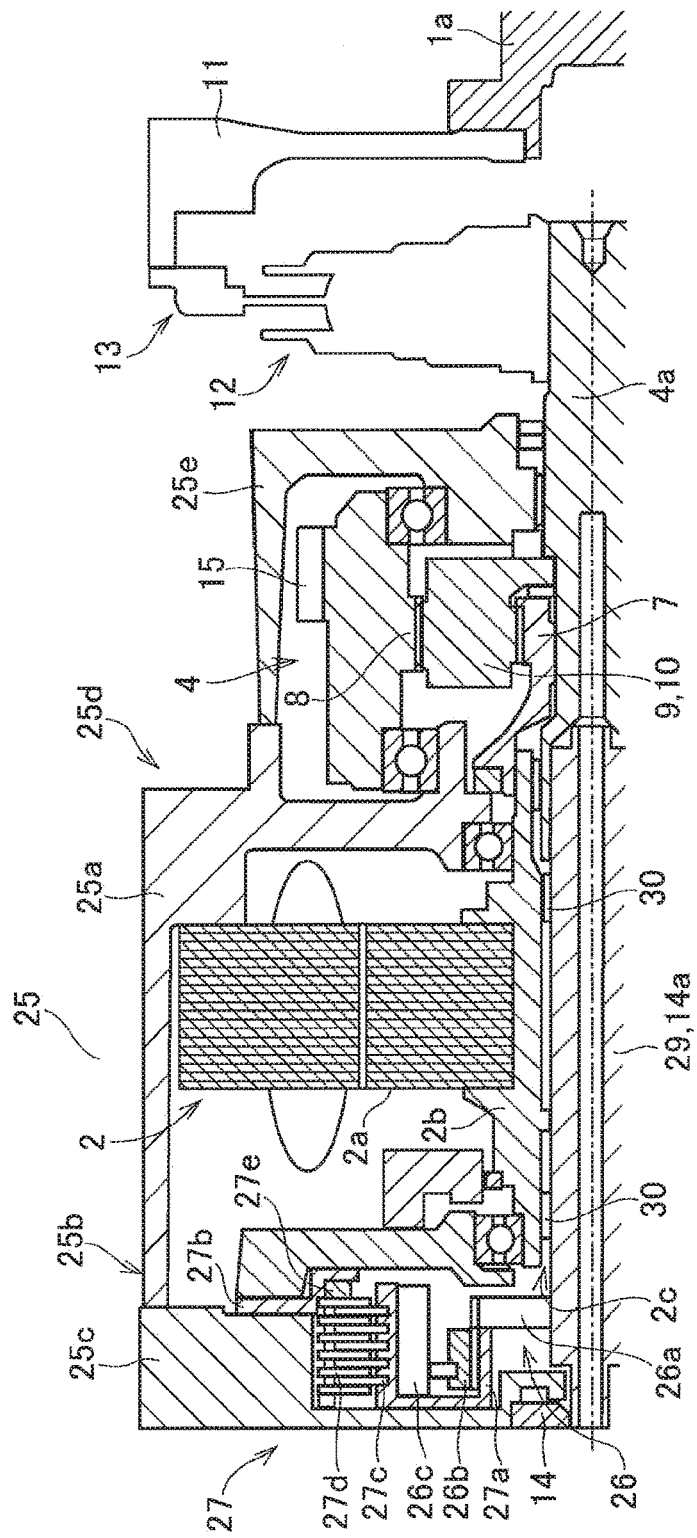
FIG. 9 is a cross-sectional view showing cross-sections of the locking device and the second torque limiter.

Turning now to FIG. 9, there are shown structures of the locking device and the second torque limiter in more detail. According to the example shown in FIG. 9, a dog clutch is used as the locking device 26. Specifically, the locking device 26 comprises rotary teeth 26a rotated integrally with the input shaft 4a through an intermediate shaft 29, fixed teeth 26b splined onto a stationary member 27a of the second torque limiter 27 while being allowed to axially reciprocate thereon but not allowed to rotate thereon, and an actuator 26c. That is, the fixed teeth 26b is fixed to the transmission case 25 by a function of the second torque limiter 27. The actuator 26c is adapted to actuate the rotary teeth 26a or the fixed teeth 26b to bring those teeth into engagement. In the example shown in FIG. 9, the fixed teeth 26b is actuated by the actuator 26c to be brought into engagement with the rotary teeth 26a, and consequently rotations of the input shaft 4a, the output shaft 1a and the carrier 9 are halted.

According to the example shown in FIG. 9, the second torque limiter 27 is adapted to restrict the torque transmitted between the drive wheels 6 and the locking device 26 while the fixed teeth 26b is brought into engagement to the rotary teeth 26a. To this end, a frictional multiple-plate clutch is used as the second torque limiter 27. In the second torque limiter 27, specifically, friction plates 27c connected to a stationary member 27a and friction plates 27d connected to a movable member 27b are elastically pushed by a diaphragm spring 27e to be brought into engagement. Consequently, in the second torque limiter 27, the stationary member 27a is integrated with the movable member 27b. In the second torque limiter 27, a friction force acting between the friction plate 27c and the friction plate 27d is governed by an elastic force of the diaphragm spring 27e. That is, an upper limit value of the torque transmittable through the second torque limiter 27 can be adjusted by adjusting a constant of the diaphragm spring 27e.

Figure 10:
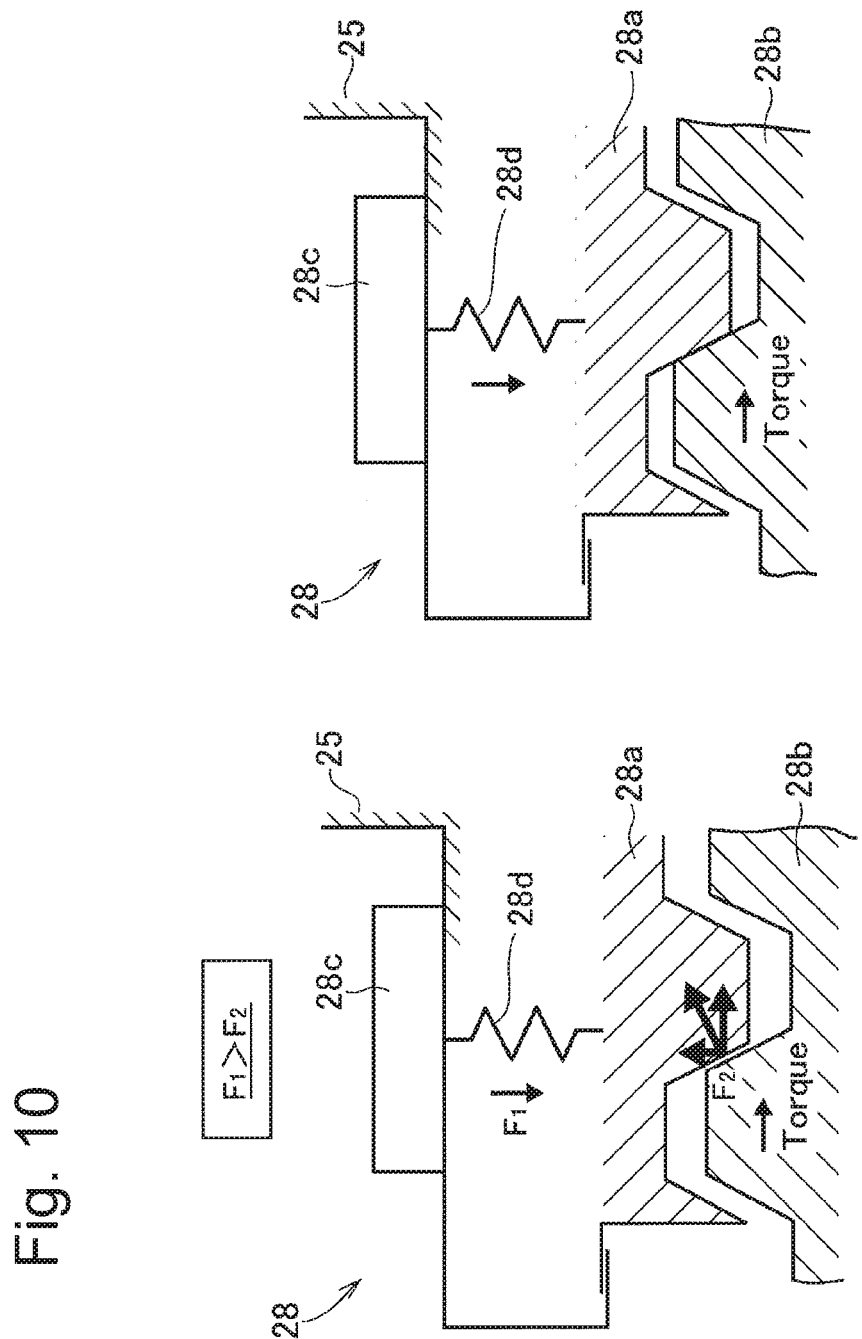
FIG. 10 is a cross-sectional view showing a situation in which a tooth clutch serving as the locking device is brought into engagement.
Figure 11:
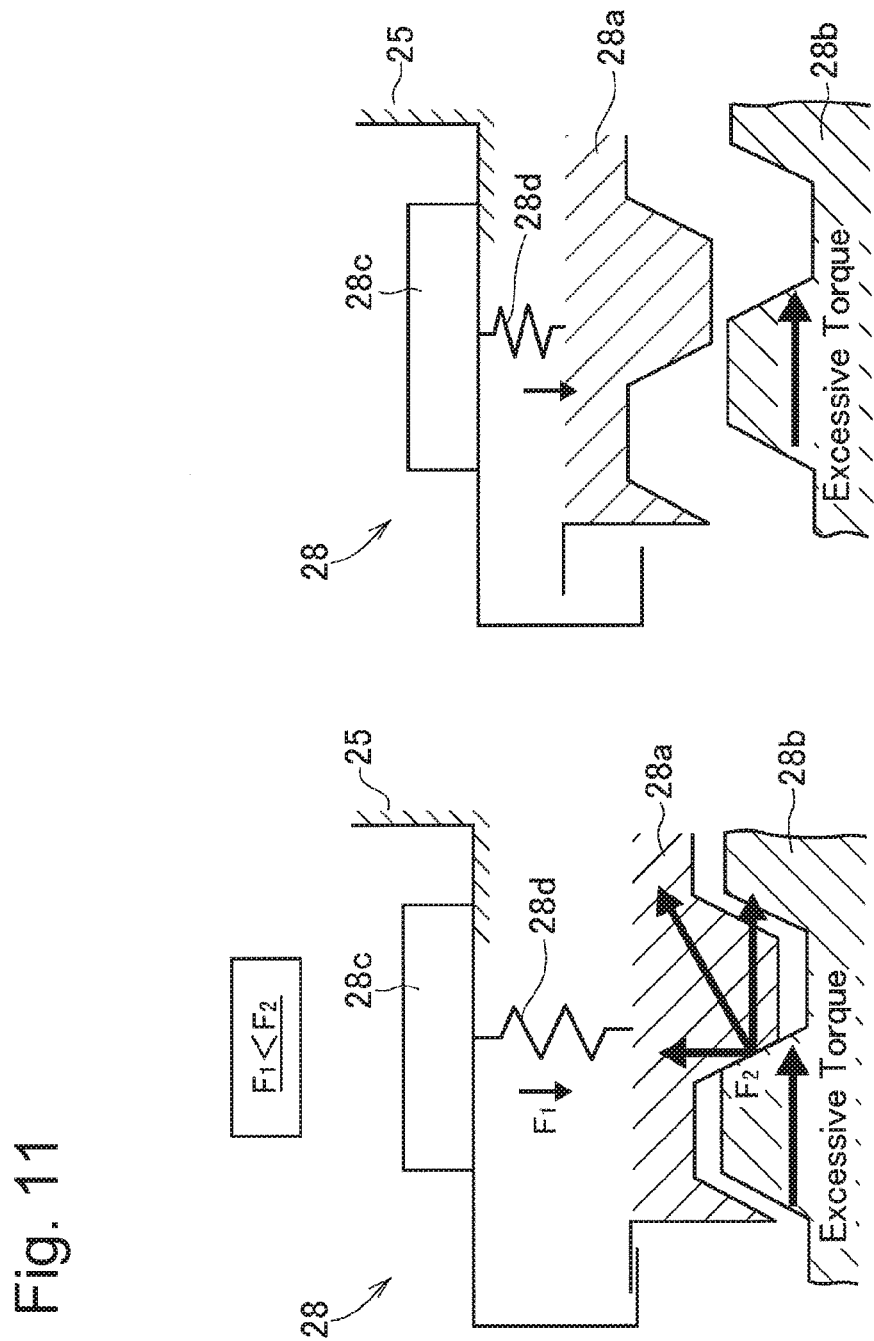
FIG. 11 is a cross-sectional view showing a situation in which the tooth clutch serving as the locking device is brought into disengagement.

A dog clutch shown in FIGS. 10 and 11 may also be used as the locking device instead of the frictional multiple-plate clutch. In this case, the locking device may serve not only as a locking device but also as a torque limiter. In the example shown in FIGS. 10 and 11, the locking device 28 as a dog clutch (or a tooth clutch) comprises a stationary member 28a and a rotary member 28b. Specifically, the stationary member 28a is splined to the transmission case 25 while being allowed to be moved by the actuator 28c in a direction of rotational axis (i.e., in a vertical direction in FIGS. 10 and 11), but not allowed to rotate. In addition, the stationary member 28a is pushed toward the rotary member 28b by a predetermined pushing force $F_1$ of an elastic member 28d. In the locking device 28, therefore, a component $F_2$ of torque acting on a contact site between engagement faces of the stationary member 28a and the rotary member 28b is established in the direction of rotational axis.

In the situation that the stationary member 28a is brought into engagement to the rotary member 28b by the actuator 28c, an engagement of the locking device 28 is maintained as illustrated in FIG. 10 as long as the component $F_2$ of the torque applied to the rotary member 28b is weaker than the pushing force $F_1$. By contrast, if the component $F_2$ of the torque applied to the rotary member 28b exceeds the pushing force $F_1$ of the elastic member 28d, the locking device 28 is brought into disengagement as illustrated in FIG. 11. That is, if an excessive torque is applied to the rotary member 28b, the stationary member 28a is brought into disengagement from the rotary member 28b so that the locking device 28 is allowed to serve as a torque limiter.

Turning back to FIG. 9, the transmission case 25 comprises a casing 25a in which a rear end 25b opposite to the engine 1 is opened, a rear cover 25c closing the rear end 25b, and a housing 25e attached to a front end 25d of the casing 25a. In the example shown in FIG. 9, the locking device 26 and the second torque limiter 27 are individually fixed to the rear cover 25c. Specifically, the fixed teeth 26b of the locking device 26 are splined onto to the intermediate shaft 29 that is inserted into a hollow space 2c of the rotor shaft 2b while being allowed to rotate relatively therewith. That is, in the example shown in FIG. 9, the locking device 26 and the second torque limiter 27 are connected to the intermediate shaft 29, the input shaft 4a and the output shaft 1a by attaching the rear cover 25c to which the locking device 26 and the second torque limiter 27 are fixed to the casing 25a.

The locking device 28 shown in FIGS. 10 and 11 having a function to serve as a torque limiter may also be fixed to the rear cover 25c. In this case, the locking device 28 may be held in the transmission case 25 by attaching the rear cover 25c to the casing 25a.

According to the example shown in FIG. 9, the locking device 26 is disposed on the opposite side of the engine 1 (i.e., left side in FIG. 9) across the first motor 2. Specifically, the output shaft 1a of the engine 1 is connected to the rotary teeth 26a of the locking device 26 through the input shaft 4a of the power distribution device 4 rotated integrally with the carrier 9, and the intermediate shaft 29 supported by a bearing 30 arranged in the hollow space 2c. In the example shown in FIG. 9, therefore, rotations of the intermediate shaft 29, the input shaft 4a, the carrier 9 and the output shaft 1a are halted by bringing the locking device 26 into engagement.

As illustrated in FIG. 9, in the power transmission unit, the oil pump 14 is connected to the output shaft 1a of the engine 1 through the intermediate shaft 29 and the input shaft 4a. That is, the intermediate shaft 29 also serves as the rotary shaft 14a that rotates a rotor of the oil pump 14. In addition, the oil pump 14 is situated in an inner circumferential side of the locking device 26. Specifically, the locking device 26 is overlapped with the oil pump 14 in an outer circumferential side of the oil pump 14 and in a diametrical direction of the intermediate shaft 29 or the input shaft 4a. That is, the oil pump 14 and the locking device 26 are situated at substantially same position in the direction of the rotational axis.

Figure 12:
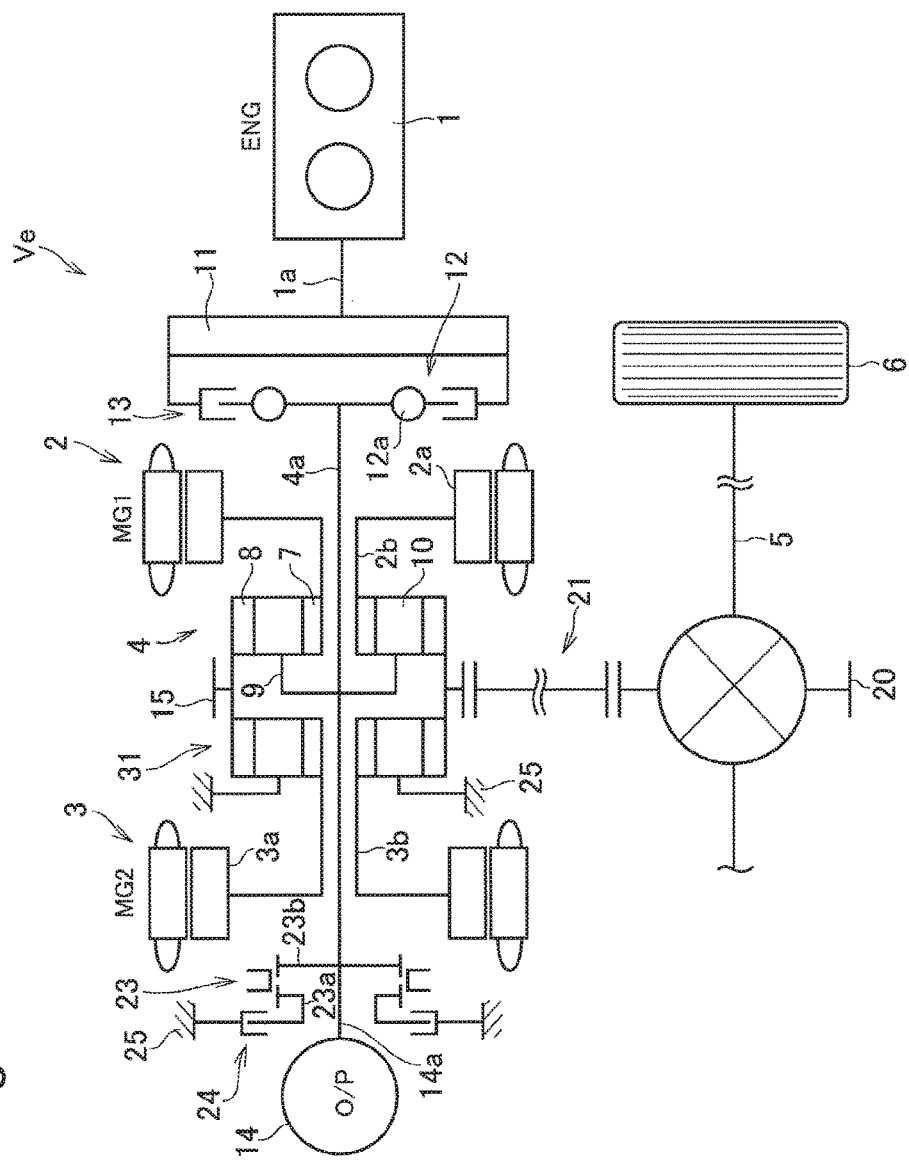
FIG. 12 is a schematic illustration showing an eighth example of the power transmission unit of the vehicle according to the present application.

Thus, in any of the foregoing examples, the rotor shaft 2b of the first motor 1 and the rotor shaft 3b of the second motor 3 extend parallel to each other. However, as illustrated in FIG. 12, the power transmission unit according to the present application may also be applied to a hybrid vehicle in which the rotor shaft 2b of the first motor 1 and the rotor shaft 3b of the second motor 3 extend coaxially. According to the eighth example shown in FIG. 12, specifically, the rotor shaft 3b of the second motor 3 is connected to the output gear train 21 through a speed reduction device 31 as a planetary gear unit and the first drive gear 15.

Figure 13:
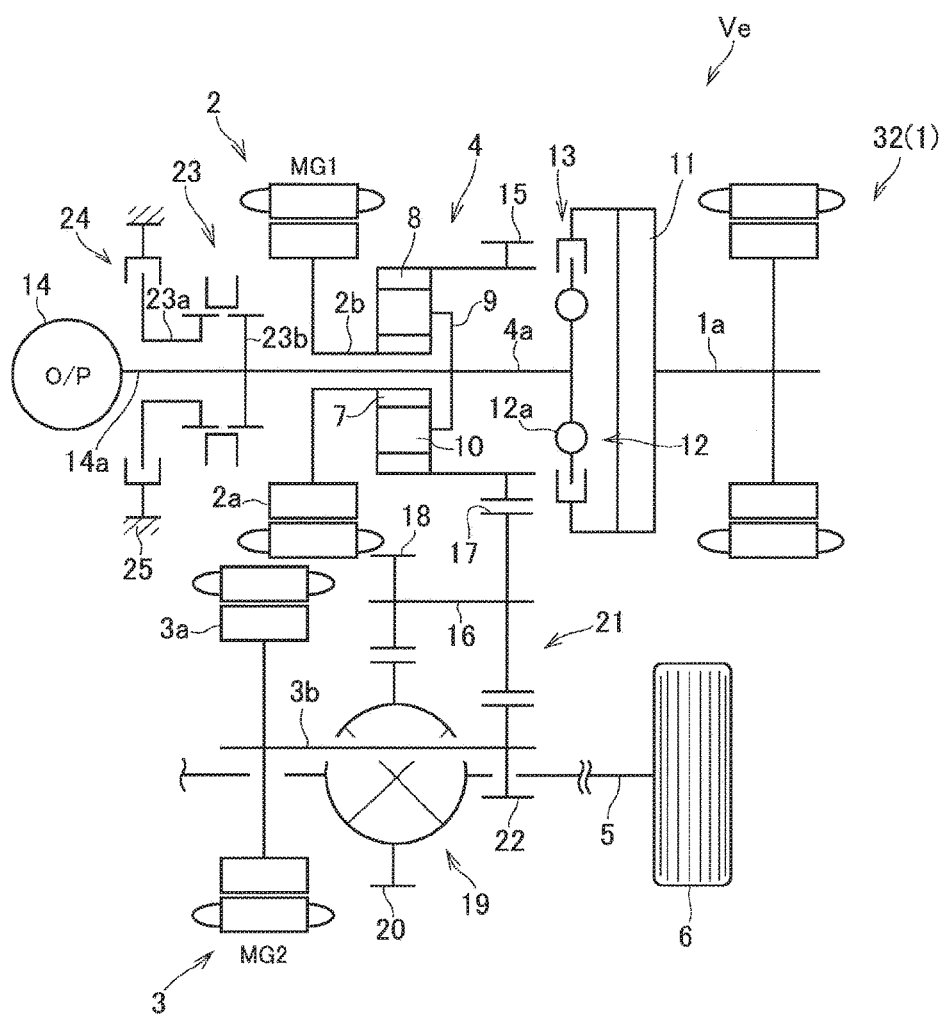
FIG. 13 is a schematic illustration showing a ninth example of the power transmission unit of the vehicle according to the present application.

In addition, according to the ninth example shown in FIG. 13, the power transmission unit according to the present application may also be applied to an electric vehicle having three motors, in which a motor 32 serves as the main prime mover instead of the engine 1.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A power transmission unit for a vehicle, comprising:
    a prime mover including a main prime mover, a first motor and a second motor;
    a transmission that transmits torque between the main prime mover and drive wheels and between the first motor and the drive wheels;
    a locking device that selectively halts a rotation of an output shaft of the main prime mover by bringing a rotary member into engagement to a stationary member;
    a transmission case holding the first motor, the second motor, the transmission, and the locking device;
    a first torque limiter that is disposed between the main prime mover and the locking device to restrict torque transmitted between the drive wheels and the main prime mover; and
    a second torque limiter that is held in the transmission case to restrict torque transmitted between the drive wheels and the locking device.

2. The power transmission unit for a vehicle as claimed in claim 1, wherein the locking device includes an engagement device that serves as the second torque limiter.

3. The power transmission unit for a vehicle as claimed in claim 2,
    wherein the transmission case includes a casing in which a rear end opposite to the main prime mover is opened, and a rear cover closing the rear end, and
    wherein the locking device is attached to the rear cover.

4. The power transmission unit for a vehicle as claimed in claim 1,
wherein the transmission includes a single-pinion planetary gear unit comprising a sun gear connected to the first motor, a ring gear connected to the drive wheels through the second motor and an output gear train, and a carrier connected to the output shaft and the rotary member, and
wherein the locking device halts rotations of the output shaft and the carrier.

5. The power transmission unit for a vehicle as claimed in claim 1,
wherein the transmission includes an input shaft connected to the output shaft,
wherein the first motor includes a hollow rotor shaft that is rotated integrally with a rotor of the first motor,
wherein the power transmission unit further comprises an intermediate shaft that is inserted into a hollow space of the rotor shaft while being supported by a bearing in such a manner as to rotate relatively with the rotor shaft,
wherein the output shaft is connected to the rotary member through the input shaft and the intermediate shaft, and
wherein the locking device is disposed on an opposite side of the main prime mover across the first motor.

6. The power transmission unit for a vehicle as claimed in claim 5, further comprising:
an oil pump that is driven by the main prime mover to generate hydraulic pressure; and
wherein the oil pump is connected to the output shaft through the intermediate shaft and the input shaft.

7. The power transmission unit for a vehicle as claimed in claim 6, wherein the locking device is overlapped with the oil pump in a diametrical direction of the output shaft, the input shaft, or the intermediate shaft.

* * * * *